(12) United States Patent
Sugamata

(10) Patent No.: US 8,406,577 B2
(45) Date of Patent: Mar. 26, 2013

(54) OPTICAL MODULATOR

(75) Inventor: Toru Sugamata, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 323 days.

(21) Appl. No.: 12/735,254

(22) PCT Filed: Dec. 24, 2008

(86) PCT No.: PCT/JP2008/073467
§ 371 (c)(1),
(2), (4) Date: Jun. 25, 2010

(87) PCT Pub. No.: WO2009/084545
PCT Pub. Date: Jul. 9, 2009

(65) Prior Publication Data
US 2010/0284644 A1    Nov. 11, 2010

(30) Foreign Application Priority Data

Dec. 28, 2007  (JP) ................. 2007-339519

(51) Int. Cl.
*G02F 1/035* (2006.01)
(52) U.S. Cl. .......................................... 385/3
(58) Field of Classification Search ............ 385/2–3
See application file for complete search history.

(56) References Cited

U.S. PATENT DOCUMENTS

| | | | |
|---|---|---|---|
| 4,769,853 A * | 9/1988 | Goodwin et al. | 398/188 |
| 2005/0185968 A1 | 8/2005 | Dorrer et al. | |
| 2009/0041472 A1 | 2/2009 | Kawanishi et al. | |

FOREIGN PATENT DOCUMENTS

| | | |
|---|---|---|
| JP | 1-070723 A | 3/1989 |
| JP | 4-282608 A | 10/1992 |
| JP | 6-289341 A | 10/1994 |
| JP | 9-079861 A | 3/1997 |
| JP | 2000-266951 A | 9/2000 |
| JP | 2004-253931 A | 9/2004 |
| JP | 2005-070301 A | 3/2005 |
| JP | 2005-237010 A | 9/2005 |
| WO | WO 2007/023858 A1 | 3/2007 |

\* cited by examiner

*Primary Examiner* — Jerry Rahll
(74) *Attorney, Agent, or Firm* — Chapman and Cutler LLP

(57) ABSTRACT

An optical modulator includes a substrate that is formed of a material having an electro-optic effect, an optical waveguide 2 that is formed on the substrate 1, the optical waveguide 2 having at least an input waveguide 21 leading the optical wave input to the optical modulator, branch waveguides 23, 24, 27, and 28 branching from the input waveguide, and an output waveguide 30 coupling the branch waveguides and leading the optical wave to the outside of the optical modulator, modulation electrodes 61 and 62 that are formed on the substrate to modulate an optical wave propagating on the waveguide, modulation means 25 and 26 that are provided at apart of the branch waveguides to modulate the optical wave propagating on the branch waveguide, where at least a part of the modulation electrodes is provided, polarization plane selection means 4 that is provided at a part of the optical waveguide up to a part where the branch waveguides are coupled, and controls the polarization plane of the optical wave modulated by the modulation means, and polarization plane adjustment means 5 that is provided at a part of the optical waveguide up to a part where the branch waveguides are coupled, and adjusts the polarization planes such that the polarization planes of the optical waves propagating on the branch waveguides are made orthogonal effectively.

14 Claims, 4 Drawing Sheets

OPTICAL MODULATOR

TECHNICAL FIELD

The present invention relates to an optical modulator, and more particularly, to an optical modulator using orthogonal polarization synthesis.

BACKGROUND ART

In the field of optical communication, a so-called multiplex wavelength transmission is mainly used, in which a plurality of optical signals with different wavelengths are multiplexed and transmitted to one optical fiber, to realize long-distance and mass transmission. Accordingly, it is possible to easily expand transmission capacity on the existing transmission path.

However, it is necessary to make wavelength gaps of optical signals dense, to multiplex a plurality of optical signals within a limited amplification band like a submarine repeater. In this case, interference called coherent crosstalk occurs between the optical signals and the light leaked from the adjacent wavelength signal, and deterioration in signal occurs.

To solve such a problem, a so-called orthogonal polarization multiplex method, in which polarization states of adjacent optical signals are made orthogonal to each other at the time of wavelength multiplexing, is proposed in Patent Citation 1 and the like.

For example, an odd-number channel multiplexer synthesizing odd-number optical signals with different wavelengths to generate multiplex light A that is random polarization light, and an even-number channel multiplexer synthesizing even-number optical signals to generate multiplex light B that is a random polarization wave are provided, the multiplex light A and multiplex light B output from the channel multiplexers are converted into vertical and horizontal linear polarization multiplex light by a multi-channel polarization controller, and the vertical polarization multiplex light and the horizontal polarization multiplex light are synthesized by a polarization synthesizer, thereby generating orthogonal polarization multiplex light.

[Patent Citation 1] JP-A-2004-253931

However, as described in Patent Citation 1, in such an orthogonal polarization multiplex method, optical components are assembled into an apparatus designed to exhibit functions, the positional alignment and adjustment of the optical components are complex and many optical components are coupled using a space optical system, thus there are problems regarding reliability such as temperature stability and long-term stability. In addition, since the apparatus is of a large size, there is a case where the apparatus cannot be housed in a transmission apparatus when the number of channels increases for multiplex wavelengths. Accordingly, the places where the apparatus can be used are limited.

Moreover, it is necessary to use expensive components such as a polarization beam splitter (PBS), an interleaver, array waveguide grating (AWG), a variable optical attenuator (VOA), and thus a cost for producing the apparatus is very high.

DISCLOSURE OF INVENTION

Technical Problem

An object of the invention is to solve the above-described problems and to provide an optical modulator using orthogonal polarization synthesis, which can be configured as a single optical element, with a small number of components, high reliability, and a relatively low production cost.

Technical Solution

To solve the problems, according to a first aspect of the invention, there is provided an optical modulator including: a substrate that is formed of a material having an electro-optic effect; an optical waveguide that is formed on the substrate, the optical waveguide having at least an input waveguide leading the optical wave input to the optical modulator, branch waveguides branching from the input waveguide, and an output waveguide coupling the branch waveguides and leading the optical wave to the outside of the optical modulator; modulation electrodes that are formed on the substrate to modulate an optical wave propagating on the waveguide; modulation means that is provided at a part of the branch waveguides to modulate the optical wave propagating on the branch waveguide, where at least a part of the modulation electrodes is provided; polarization plane selection means that is provided at a part of the optical waveguide to a part where the branch waveguides are coupled, and controls the polarization plane of the optical wave modulated by the modulation means; and polarization plane adjustment means that is provided at a part of the optical waveguide from the polarization plane selection means to a part where the branch waveguides are coupled, and adjusts the polarization planes such that the polarization planes of the optical waves propagating on the branch waveguides are made orthogonal effectively.

The polarization plane selection means may be provided at any stage before and after the modulation means, as is clear from the invention.

According to a second aspect of the invention, in the optical modulator described in the first aspect, the polarization plane selection means is provided on an input end face of the optical waveguide or at a part of the optical waveguide between the input end face and the part where the branch waveguides are coupled.

According to a third aspect of the invention, in the optical modulator described in the first or second aspect, the polarization plane selection means and the polarization plane adjustment means are closely provided in a propagating direction of the optical wave. More preferably, the polarization plane selection means and the polarization plane adjustment means are continuously provided.

According to a fourth aspect of the invention, in the optical modulator described in any one of the first to third aspects, the polarization plane adjustment means is provided close to the part where the branch waveguides are coupled in the propagating direction of the optical wave. More preferably, the polarization plane selection means and the polarization plane adjustment means are provided between the modulation means and the part where the branch waveguides are coupled, and the polarization plane adjustment means is provided close to the part where the branch waveguides are coupled as described above.

According to a fifth aspect of the invention, in the optical modulator described in any one of the first to fourth aspects, the optical waveguide has a polarization maintaining function.

According to a sixth aspect of the invention, in the optical modulator described in any one of the first to fifth aspects, the polarization plane selection means is a metal-clad polarizer formed on the optical waveguide or a thin plate polarizer provided in the optical waveguide or the input end face of the optical waveguide.

According to a seventh aspect of the invention, in the optical modulator described in any one of the first to sixth aspects, the polarization plane adjustment means is a wavelength plate provided in at least one branch waveguide.

According to an eighth aspect of the invention, in the optical modulator described in the seventh aspect, the wavelength plate is set with about $\lambda/2$ with respect to a wavelength $\lambda$ of the optical wave propagating on the optical waveguide.

According to a ninth aspect of the invention, in the optical modulator described in any one of the first to seventh aspects, the polarization plane adjustment means rotates the polarization plane of the optical wave propagating on the optical waveguide by 45°, and the polarization plane adjustment means are provided on the branch waveguides such that the polarization planes are rotated in different directions.

According to a tenth aspect of the invention, in the optical modulator described in the seventh or eighth aspect, the branch waveguide, where the wavelength plate is not provided, is provided with loss applying means with the same loss as that of the wavelength plate.

According to an eleventh aspect of the invention, in the optical modulator described in the tenth aspect, the loss applying means is formed of quartz, glass, adhesive, polymer, metal thin film, or a complex material thereof, which is provided across the optical waveguide.

According to a twelfth aspect of the invention, in the optical modulator described in any one of the sixth to eleventh aspects, when any one of the thin plate polarizer, the wavelength plate, or the loss applying means is provided in the optical waveguide, these members across the optical waveguide are provided in a state where a plane of the members is inclined from a face perpendicular to the propagating direction of the optical wave in the optical waveguide.

Advantageous Effects

According to the first aspect of the invention, an optical modulator includes: a substrate that is formed of a material having an electro-optic effect; an optical waveguide that is formed on the substrate, the optical waveguide having at least an input waveguide leading the optical wave input to the optical modulator, branch waveguides branching from the input waveguide, and an output waveguide coupling the branch waveguides and leading the optical wave to the outside of the optical modulator; modulation electrodes that are formed on the substrate to modulate an optical wave propagating on the waveguide; modulation means that is provided at a part of the branch waveguides to modulate the optical wave propagating on the branch waveguide, where at least a part of the modulation electrodes is provided; polarization plane selection means that is provided at a part of the optical waveguide up to a part where the branch waveguides are coupled, and controls the polarization plane of the optical wave modulated by the modulation means; and polarization plane adjustment means that is provided at a part of the optical waveguide from the polarization plane selection means to a part where the branch waveguides are coupled, and adjusts the polarization planes such that the polarization planes of the optical waves propagating on the branch waveguides are made orthogonal effectively. With such a configuration, the optical modulator using orthogonal polarization synthesis can be configured as a single optical element, with a small number of components, high reliability, and a relatively low production cost.

According to the second aspect of the invention, the polarization plane selection means is provided on an input end face of the optical waveguide or at a part of the optical waveguide from the input end face to the part where the branch waveguides are coupled. With such a configuration, the polarization plane selection means for controlling the polarization plane of the optical wave modulated by the modulation means can be easily assembled in the single optical element.

According to the third aspect of the invention, the polarization plane selection means and the polarization plane adjustment means are closely provided in a propagating direction of the optical wave. With such a configuration, the polarization state can be prevented from being varied until the polarization plane controlled by the polarization plane selection means reaches the polarization plane adjustment means, and it is possible to more preferably control and adjust the polarization plane. Particularly, the polarization plane selection means and the polarization plane adjustment means are continuously provided, and thus the polarization state is prevented from being varied between both.

According to the fourth aspect of the invention, the polarization plane adjustment means is provided close to the part where the branch waveguides are coupled in the propagating direction of the optical wave. With such a configuration, the polarization state can be prevented from being varied until the polarization plane adjusted by the polarization plane adjustment means reaches the coupling part of the branch waveguides, and thus it is possible to perform orthogonal polarization synthesis in a preferable state. Particularly, the polarization plane selection means and the polarization plane adjustment means are provided between the modulation means and the part where the branch waveguides are coupled, and the polarization plane adjustment means is provided close to the part where the branch waveguides are coupled as described above. With such a configuration, it is possible to avoid variation in polarization state caused by the modulation means or variation in polarization state at the time of propagating on the optical waveguide, and thus it is possible to obtain more appropriate orthogonal polarization synthesis.

According to the fifth aspect of the invention, the optical waveguide has a polarization maintaining function. With such a configuration, it is possible to keep the polarization plane state subjected to the control or adjustment when the optical wave propagates on the optical waveguide after the polarization plane of the optical wave is controlled or adjusted. Therefore, it is possible to reliably perform the orthogonal polarization synthesis, and it is possible to output the optical wave maintaining the orthogonal polarization synthesized state from the optical modulator.

According to the sixth aspect of the invention, the polarization plane selection means is a metal-clad polarizer formed on the optical waveguide or a thin, plate polarizer provided in the optical waveguide or the input end face of the optical waveguide. With such a configuration, the polarization plane selection means controlling the polarization plane of the optical wave can be easily assembled in the single optical element. In addition, when the polarization plane selection means is the metal-clad polarizer or the thin plate polarizer provided on the input end face, a cutting process or an etching process for forming a groove on the substrate is unnecessary, the production process is not complicated, and it is possible to prevent productivity from decreasing and to prevent the cost from increasing.

According to the seventh aspect of the invention, the polarization plane adjustment means is a wavelength plate provided in at least one branch waveguide. With such a configuration, the polarization plane adjustment means for adjusting the polarization plane such that the polarization planes of the optical waves propagating on the branch waveguides are made orthogonal effectively can be easily assembled in the single optical element.

According to the eighth aspect of the invention, the wavelength plate is set with about λ/2 with respect to a wavelength λ of the optical wave propagating on the optical waveguide. With such a configuration, the polarization planes of the optical waves can be rotated by 90°. Therefore, the optical waves propagating on the branch waveguides with the same polarization plane can be easily adjusted with the polarization planes made orthogonal effectively.

According to the ninth aspect of the invention, the polarization plane adjustment means rotates the polarization plane of the optical wave propagating on the optical waveguide by 45°, and the polarization plane adjustment means are provided on the branch waveguides such that the polarization planes are rotated in different directions. With such a configuration, the optical waves propagating on the branch waveguides are adjusted in the orthogonal state, and the loss (deterioration in light intensity) of the optical waves caused by the wavelength plate on the branch waveguides can be uniform. The rotation angle is small as compared with the case of rotating by 90°, and the thickness of the polarization plane adjustment means in the axial direction (the propagating direction of the optical wave) can be made thin. For this reason, it is possible to reduce the loss and the polarization rotating variation of the optical wave caused by the polarization plane adjustment means, and it is possible to form the groove on the substrate with a small width when providing the polarization plane adjustment means, and thus it is possible to reduce mechanical load applied to the substrate.

According to the tenth aspect of the invention, the branch waveguide, where the wavelength plate is not provided, is provided with loss applying means with the same loss as that of the wavelength plate. With such a configuration, when the optical waves propagating on the branch waveguides are synthesized, it is possible to suppress variation in the light intensity of the synthesized optical waves.

According to the eleventh aspect of the invention, the loss applying means is formed of quartz, glass, adhesive, polymer, metal thin film, or a complex material thereof, which is provided across the optical waveguide. With such a configuration, the loss applying means can be easily assembled in the single optical element.

According to the twelfth aspect of the invention, when any one of the thin plate polarizer, the wavelength plate, or the loss applying means is provided in the optical waveguide, these members across the optical waveguide are provided in a state where a plane of the members is inclined from a face perpendicular to the propagating direction of the optical wave in the optical waveguide. With such a configuration, the optical wave is prevented from becoming returned light which propagates on the optical waveguide in a reverse direction even when the optical wave is reflected from the face. For this reason, interference between signals caused by the returned light or a decrease in signal level are prevented, an operation of the optical modulator is stabilized, and it is possible to suppress that the returned light is input to a light source such as a semiconductor laser to make an operation of the light source unstable.

EXPLANATION OF REFERENCES

1: SUBSTRATE
2: OPTICAL WAVEGUIDE
4, 41, 42, 43: POLARIZATION PLANE SELECTION MEANS
5, 52: POLARIZATION PLANE ADJUSTMENT MEANS
7: INPUT OPTICAL FIBER
8: OUTPUT OPTICAL FIBER
21: INPUT WAVEGUIDE
22: BRANCH PORTION
23, 24, 27, 28: BRANCH WAVEGUIDE
25, 26, 31, 32: MODULATION MEANS
29: WAVE COUPLING PORTION
30: OUTPUT WAVEGUIDE
51, 90: GROOVE
53, 91, 92, 93: LOSS APPLYING MEANS

BEST MODE FOR CARRYING OUT THE INVENTION

Hereinafter, the invention will be described in detail using preferable embodiments.

Figure 1:
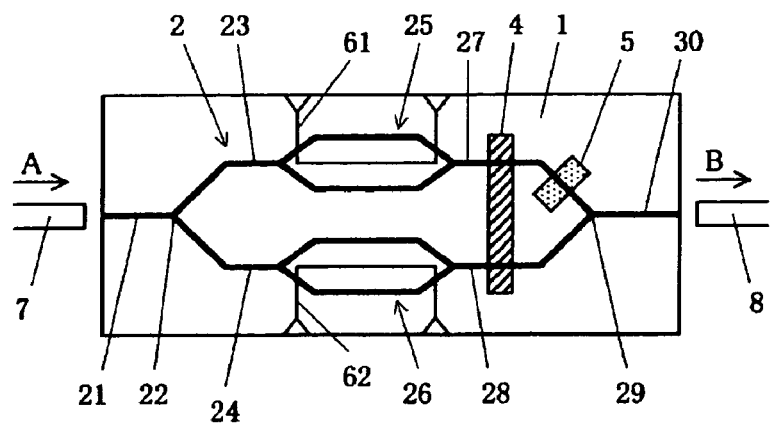
FIG. 1 is a schematic diagram illustrating an optical modulator according to a first embodiment of the invention.

FIG. 1 is a diagram illustrating an optical modulator according to a first embodiment of the invention.

An optical modulator of the invention includes: a substrate 1 that is formed of a material having an electro-optic effect; an optical waveguide 2 that is formed on the substrate, the optical waveguide 2 having at least an input waveguide 21 leading the optical wave input to the optical modulator, branch waveguides 23, 24, 27, and 28 branching from the input waveguide, and an output waveguide 30 coupling the branch waveguides and leading the optical wave to the outside of the optical modulator; modulation electrodes 61 and 62 that are formed on the substrate to modulate an optical wave propagating on the waveguide; modulation means 25 and 26 that are provided at a part of the branch waveguides to modulate the optical wave propagating on the branch waveguide, where at least a part of the modulation electrodes is provided; polarization plane selection means 4 that is provided at a part of the optical waveguide up to a part where the branch waveguides are coupled, and controls the polarization plane of the optical wave modulated by the modulation means; and polarization plane adjustment means 5 that is provided at apart of the optical waveguide from the polarization plane selection means to a part where the branch waveguides are coupled, and adjusts the polarization planes such that the polarization planes of the optical waves propagating on the branch waveguides are made orthogonal effectively. An input optical fiber 7 is connected to the input side of the optical modulator, and an output optical fiber 8 is connected to the output side thereof. The arrows A and B denote the propagating direction of the optical wave.

The substrate 1 having the electro-optic effect can be made of, for example, lithium niobate, lithium tantalate, PLZT (lanthanum-modified lead zirconate titanate), quartz-based material, and combination thereof. Particularly, lithium niobate (LN) or lithium tantalate (LT) crystal with a high electro-optic effect is appropriately used.

The optical waveguide can be formed by diffusing Ti or the like on the surface of the substrate by a thermal diffusion method, a proton exchange method, or the like. As described in Patent Citation 2, the optical waveguide can be formed by forming a ridge on the surface of the substrate 1 according to the shape of the optical waveguide.

Preferably, in the optical modulator of the invention, the optical waveguide has a polarization maintaining function. As described later, the reason is because it is possible to keep the polarization plane state subjected to the control or adjustment when the optical wave propagates on the optical waveguide after the polarization plane of the optical wave is controlled or adjusted, it is possible to reliably perform the orthogonal polarization synthesis, and it is possible to output the optical wave maintaining the orthogonal polarization synthesized state from the optical modulator.

[Patent Citation 2] JP-A-6-289341

The modulation electrodes constituting the modulation means can be formed on the surface or back surface of the substrate by forming an electrode pattern of Ti and Au and by a gold plating method. The modulation electrodes include a signal electrode propagating a modulation signal, and a ground electrode provided around the signal electrode. In FIG. 1, only the signal electrodes 61 and 62 are shown as an example. Of course, the shape and disposition of the signal electrode and the ground electrode may be appropriately set according to what modulation is performed by the modulation means 25 and 26 and what kind of substrate (X-cut substrate or Z-cut substrate) is used.

Although not shown particularly, a buffer layer may be formed between the substrate 1 and the modulation electrode formed on the substrate. With such a configuration, the optical wave propagating on the optical waveguide is effectively prevented from being absorbed or diffused by the modulation electrodes. In addition, speed matching can be improved between the modulation signal applied from the modulation electrode and the optical wave propagating on the optical waveguide.

Figure 2:
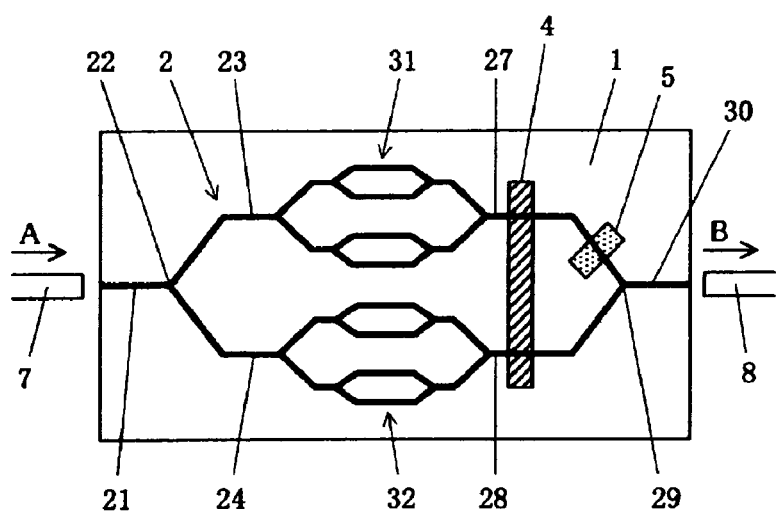
FIG. 2 is a schematic diagram illustrating an optical modulator according to a second embodiment of the invention.

Various shapes of the optical waveguide can be employed, and the main configuration as the optical modulator of the invention is that the input waveguide 21 leading the optical wave input to the optical modulator, the branch waveguides 23, 24, 27, and 28 branching from the input waveguide, and the output waveguide 30 coupling the branch waveguides and leading the optical wave to the outside of the optical modulator are provided, and the modulation means 25 and 26 for modulating the optical waves propagating on the branch waveguides are formed at a part of the branch waveguides. As the modulation means, Mach-Zehnder optical waveguides 25 and 26 may be used as shown in FIG. 1, or nest-type optical waveguides 31 and 32 used as a SSB modulator or the like may be used as shown in FIG. 2 according to a second embodiment, and various modulation methods can be employed. Of course, different modulation methods may be employed for each branch waveguide.

The optical modulator of the invention is provided with the polarization plane selection means 4 for controlling the polarization plane of the optical wave to control the polarization plane of the optical waves and to perform orthogonal polarization synthesis of the optical waves, and the polarization plane adjustment means 5 for adjusting the polarization plane such that the polarization planes of the optical waves are made orthogonal effectively.

A metal-clad polarizer formed on the optical waveguide or a thin plate polarizer provided on the input end face of the optical waveguide or in the optical waveguide may be used as the polarization plane selection means 4.

The metal-clad polarizer is that a metal film such as aluminum is provided on the optical waveguide, a polarization plane (TE mode light) perpendicular to the metal film is absorbed, and a polarization plane (TM mode light) parallel to the metal film is controlled. In addition, a ridge may be formed along the optical waveguide, and the side of the ridge may be loaded with the metal film. In this case, the TM mode light is absorbed and the polarization plane is controlled to the TE mode light.

Figure 3:
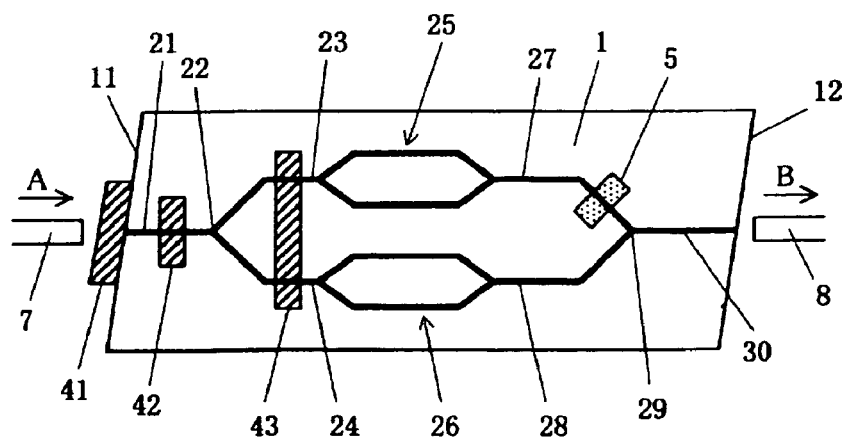
FIG. 3 is a schematic diagram illustrating an optical modulator according to a third embodiment of the invention.

The polarization plane selection means 4 may be provided at a part of the branch waveguides 27 and 28 between the modulation means (25, 26, 31, and 32) and the wave coupling portion 29 as shown in FIG. 1 or FIG. 2, and any one of the polarization plane selection means 41, 42, and 43 may be provided at an arbitrary place closer to the input side of the optical wave than the modulation means 25 and 26 as shown in FIG. 3 according to the third embodiment. Specifically, there is a method where the thin plate polarizer 41 may be attached to the input end face 11 of the substrate 1, or a method where the input waveguide 21 or the branch waveguides 23 and 24 are provided with a groove formed across the metal-clad polarizer or the optical waveguide and the thin film polarizer is provided in the groove.

As shown in FIG. 3 by the polarization plane selection means (thin plate polarizer) 41, when the polarization plane is provided across the propagating direction of the optical wave, the polarization plane selection means 41 is provided such that the crossing face is inclined from the face perpendicular to the propagating direction of the optical wave. The reason is to avoid that the optical wave is reflected by the polarization plane selection means and the light propagates in the reverse direction, in other words, the occurrence of returned light. The returned light causes various problems, for example, the returned light causes interference between signals or a decrease in signal level, and enters the light source such as the semiconductor laser to make the operation of the light source unstable. It is preferable to prepare the same countermeasure with respect to the polarization plane adjustment means and the loss applying means to be described later.

Figure 4:
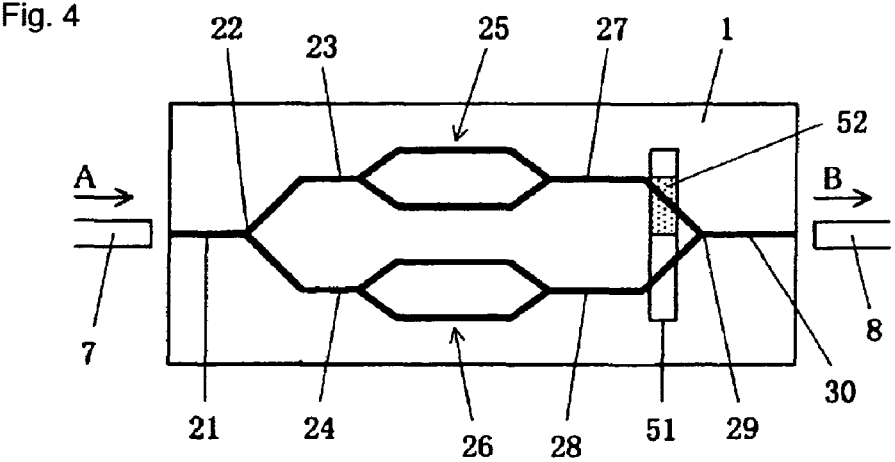
FIG. 4 is a schematic diagram illustrating an optical modulator according to a fourth embodiment of the invention.

FIG. 4 is a diagram illustrating an optical modulator according to a fourth embodiment of the invention. Although the polarization plane selection means is not shown in FIG. 4, the polarization plane selection means can be appropriately provided in the substrate 1 as shown in FIG. 1 to FIG. 3. With respect to the optical wave A input to the optical modulation, when the polarization plane is controlled to any one of the TE mode light or the TM mode light, it is unnecessary to separately provide polarization plane selection means in the element of the optical modulator. The invention also includes the configuration in which the polarization plane selection means is provided outside the element as described above.

Next, the polarization plane adjustment means 5 and 52 will be described.

The polarization plane adjustment means adjusts the angle of the polarization planes of the optical waves by rotating the polarization plane of at least one of the optical waves propagating on the branch waveguides such that the polarization plane of the optical waves propagating on the branch waveguides is made orthogonal.

Specifically, a wavelength plate can be used, and particularly, a wavelength plate with about λ/2 with respect to a wavelength λ of the optical wave propagating on the optical waveguide can be appropriately used, since the polarization plane of the optical wave is rotated by 90°.

A material with double refraction such as crystal, butyl, and garnet can be used as the wavelength plate.

The polarization plane adjustment means may rotate the polarization plane of the optical wave propagating on the optical waveguide by 45°. In this case, two polarization plane adjustment means are prepared and provided on the branch waveguides such that the polarization planes of the optical waves propagating on the branch waveguides are rotated in different directions by 45°. With such a configuration, it is possible to adjust the optical waves propagating on the branch waveguides to be made orthogonal to each other, and it is possible to make the loss of the optical waves uniform, such as deterioration in light intensity caused by the wavelength plate on the branch waveguides. Since the rotation angle is small as compared with the case of the wavelength plate of λ/2, it is possible to reduce the thickness of the polarization plane adjustment means in an optical axial direction (the propagating direction of the optical wave). For this reason, it is possible to reduce the loss of the optical wave caused by the polarization plane adjustment means and the variation of the polarization rotating, it is possible to form the width of the groove on the substrate to be small at the time of providing the polarization plane adjustment means, and thus it is possible to reduce the mechanical load applied to the substrate.

A material with double refraction such as crystal, butyl, and garnet can be used as the polarization plane adjustment means, and the thickness in the propagating direction of the optical wave may be appropriately adjusted.

As shown in FIG. 1 to FIG. 3, The polarization plane adjustment means can be configured by forming a groove across the optical waveguide at a part of the branch waveguide and inserting the wavelength plate therein, or by forming a groove 51 over the plurality of branch waveguides as shown in FIG. 4 and providing the wavelength plate 52 in the groove since the branch waveguides are very close at several hundred μm.

Basically, the polarization plane adjustment means may be provided in at least one of the branch waveguides. When the polarization plane adjustment means is provided in the branch waveguide, it is preferable to provide it between the rear end of the polarization plane selection means and the wave coupling portion 29.

It is preferable to provide the polarization plane selection means and the polarization plane adjustment means as close as possible in the propagating direction of the optical wave. The reason is to prevent the polarization state from being varied until the polarization plane controlled by the polarization plane selection means reaches the polarization plane adjustment means. Particularly, it is preferable to continuously provide the polarization plane selection means and the polarization plane adjustment means.

In addition, it is preferable to provide the polarization plane adjustment means at a position close to the part where the branch waveguides are coupled in the propagating direction of the optical wave. The reason is to prevent the polarization state from being varied until the polarization plane adjusted by the polarization plane adjustment means reaches the coupling portion of the branch waveguides. The polarization plane selection means and the polarization plane adjustment means are provided between the modulation means and the part where the branch waveguides are coupled, and the polarization plane adjustment means are provided at the position close to the part where the branch waveguides are coupled, thereby avoiding the variation of the polarization state caused by the modulation means or the variation of the polarization state at the time of propagating on the optical waveguide. Accordingly, it is possible to obtain the orthogonal polarization synthesis in a more appropriate state.

In addition, when the polarization plane adjustment means is provided, a defect occurs, for example, the light intensity of the optical wave decreases or the phase is varied. For this reason, as shown in FIG. 5 and FIG. 6 by the fifth embodiment and the sixth embodiment, the branch waveguides, where no polarization plane adjustment means is provided, are provided with loss applying means 53 and 54 which generate substantially the same loss and/or substantially the same phase difference as that of the polarization plane adjustment means (wavelength plate).

Figure 5:
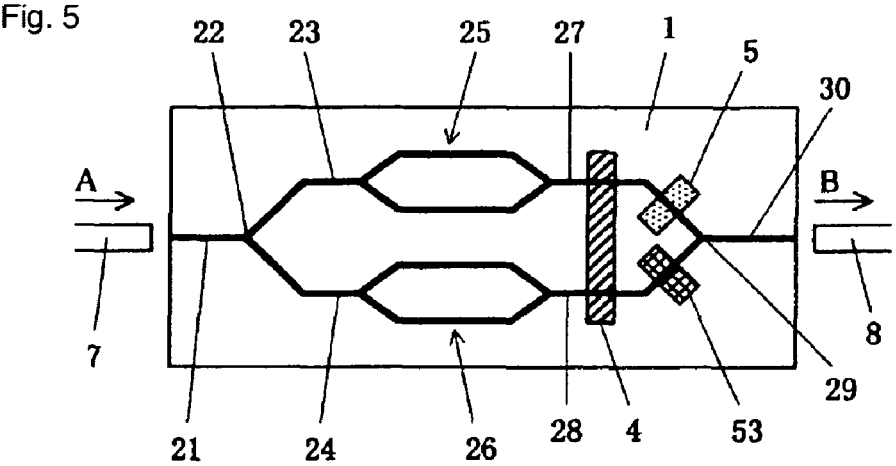
FIG. 5 is a schematic diagram illustrating an optical modulator according to a fifth embodiment of the invention.
Figure 6:
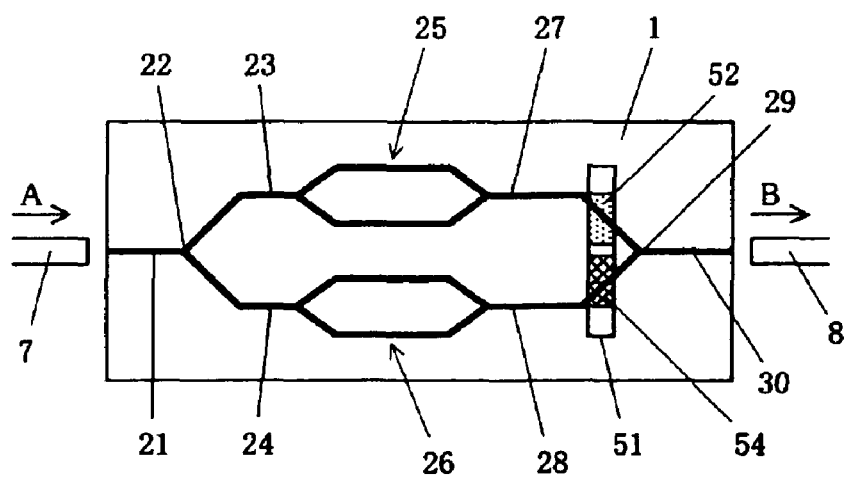
FIG. 6 is a schematic diagram illustrating an optical modulator according to a sixth embodiment of the invention.

As described above, when the polarization plane adjustment means for rotating the polarization plane by 45° is used, for example, the polarization plane adjustment means 5 shown in FIG. 5 may be used as the polarization plane adjustment means for rotating in one direction by 45°, and the other polarization plane adjustment means for rotating in the other direction by 45° may be provided instead of the loss applying means 53. The polarization plane adjustment means 52 shown in FIG. 6 may be used as the polarization plane adjustment means for rotating in one direction by 45°, and the other polarization plane adjustment means for rotating in the other direction by 45° may be provided instead of the loss applying means 54.

The loss applying means may be formed of quartz, glass, adhesive, polymer, metal thin film, or a complex material thereof, which is provided across the optical waveguide.

Figure 7:
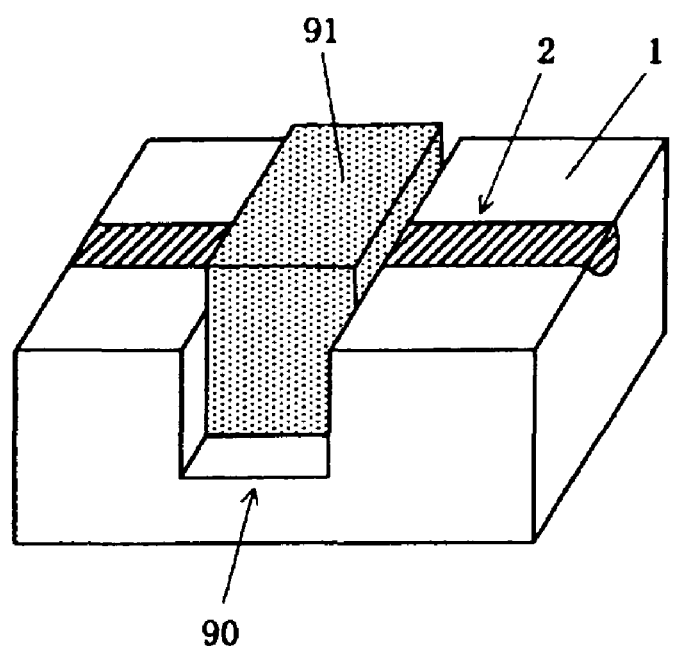
FIG. 7 is a diagram illustrating an example of loss applying means (board-shaped member).
Figure 8:
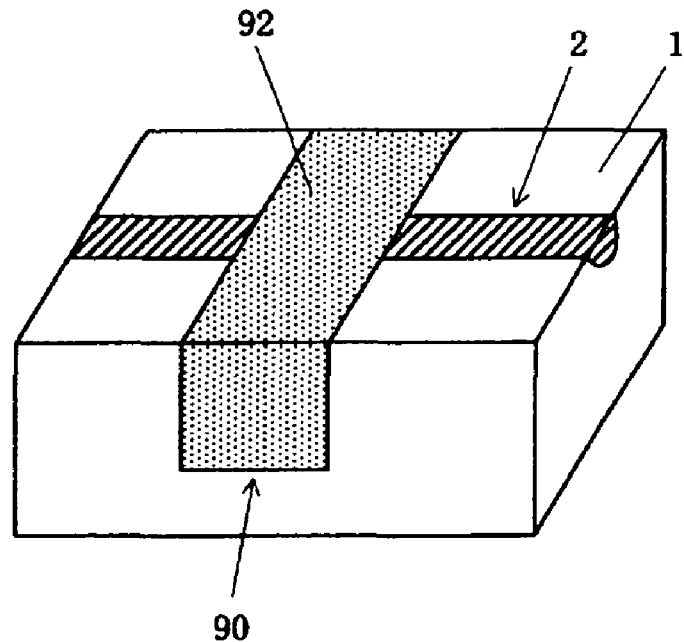
FIG. 8 is a diagram illustrating an example of loss applying means (filler).
Figure 9:
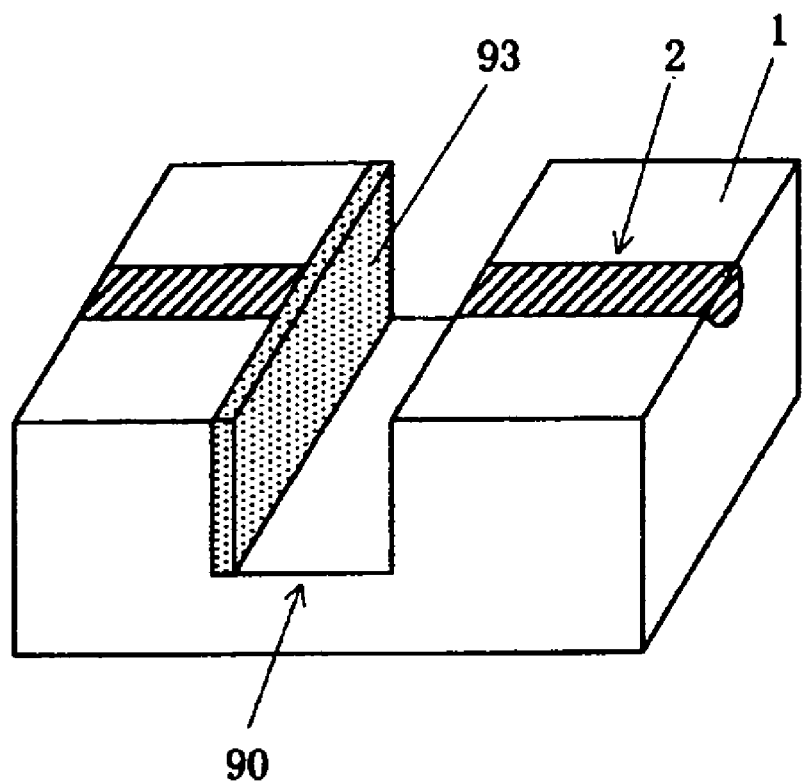
FIG. 9 is a diagram illustrating an example of loss applying means (film).

FIG. 7 to FIG. 9 show examples of dispositional state of the loss applying means. In FIG. 7, the substrate 1 is provided with the groove 90 formed across the optical waveguide 2, and a board-shaped member 91 such as quartz and glass is provided in the groove. In FIG. 8, the groove 90 is filled into a filler 92 such as adhesive and polymer. In FIG. 9, a film 93 such as polymer and metal thin film is formed on one side of the groove 90.

The groove formed to provide the loss applying means is not limited to the method of forming only on the branch waveguides formed as shown in FIG. 5, and can be also used as the groove 51 for the polarization plane adjustment means as shown in FIG. 6.

The optical modulator of the invention is not limited to the above description, for example, the polarization plane selection means and the polarization plane adjustment means are commonly used, and the thin plate polarizer and the waveguide plate may be provided to overlap the groove going across the optical waveguide. In addition, a polarizer for selecting TM mode light may be provided on one side of the branch waveguides, and a polarizer for selecting the TE mode light may be provided on the other side of the branch waveguides.

A plurality of metal-clad polarizers, thin plate polarizers, or the like may be provided in the branch waveguides as necessary within the range where the optical wave propagating on the optical waveguide is not drastically attenuated, to constantly keep the polarization plane appropriate.

An operation of the above-described optical modulator will be described with reference to FIG. 1.

The optical wave input from the input optical fiber 7 propagates on the input waveguide 21, is branched into two parts at the branch portion 22, and propagates on the branch waveguides 23 and 24. The number of branched parts is not limited to two parts, and can be varied according to the number of necessary modulation channels.

The branched optical waves are modulated by the modulation means 25 and 26, and propagate on the rear branch waveguides 27 and 28 as modulated light. To control and adjust the polarization plane of the modulated light, first, the polarization planes are matched into one polarization plane by the polarization plane selection means 4, and then the polarization plane of one-side modulated light is rotated by 90° by the polarization plane adjustment means 5. The modulated lights, the polarization planes of which are orthogonal to each other, are synthesized by the wave coupling portion 29, and the synthesized light propagates to the output optical fiber 8 connected to the optical modulator, through the output waveguide 30. As described above, it is possible to simply achieve the orthogonal polarization synthesis with the single optical modulator.

Industrial Applicability

According to the invention, it is possible to provide the optical modulator using orthogonal polarization synthesis, which can be configured as a single optical element, with a small number of components, high reliability, and a relatively low production cost.

The invention claimed is:

1. An optical modulator comprising:
   a substrate that is formed of a material having an electro-optic effect;
   an optical waveguide formed on the substrate, the optical waveguide having at least an input waveguide leading optical waves input to the optical modulator, branch waveguides branching from the input waveguide, and an output waveguide coupling the branch waveguides and leading the optical waves to an outside of the optical modulator;
   modulation electrodes formed on the substrate to modulate optical waves propagating on the optical waveguide;
   modulation means provided at a position on the respective branch waveguides to modulate the optical waves propagating on the branch waveguides, located at a position where at least a part of the modulation electrodes are provided;
   polarization plane selection means provided at a position that is located between an input optical fiber and a point where the branch waveguides are coupled, wherein said polarization plane selection means controls polarization planes of the optical waves modulated by the modulation means; and
   polarization plane adjustment means provided at a position that is located between the polarization plane selection means and the point where the branch waveguides are coupled, wherein said polarization plane adjustment means adjusts polarization planes such that the polarization plane of a first one of the optical waves propagating on the branch waveguides is made orthogonal to the polarization plane of a second one of the optical waves.

2. The optical modulator according to claim 1, wherein the polarization plane selection means is provided on an input end face of the optical waveguide.

3. The optical modulator according to claim 1, wherein the positions of the polarization plane selection means and the polarization plane adjustment means are located closely to one another in a propagating direction of the optical waves.

4. The optical modulator according to claim 1, wherein the position of the polarization plane adjustment means is located closely to the point where the branch waveguides are coupled in a propagating direction of the optical waves.

5. The optical modulator according to claim 1, wherein the optical waveguide has a polarization maintaining function.

6. The optical modulator according to claim 1, wherein the polarization plane selection means is a metal-clad polarizer formed on the optical waveguide, or a thin plate polarizer provided in the optical waveguide or the input end face of the optical waveguide.

7. The optical modulator according to claim 1, wherein the polarization plane adjustment means is a wavelength plate provided in at least a first branch waveguide.

8. The optical modulator according to claim 7, wherein the wavelength plate is set at about $\lambda/2$ with respect to a wavelength $\lambda$ of the optical waves propagating on the optical waveguide.

9. The optical modulator according to claim 7, wherein a second branch waveguide, where the wavelength plate is not positioned, is provided with loss applying means with substantially the same loss as that of the wavelength plate.

10. The optical modulator according to claim 9, wherein the loss applying means is provided in a state where a plane of the loss applying means is inclined from a face perpendicular to the propagating direction of the optical waves in the optical waveguide.

11. The optical modulator according to claim 9, wherein the loss applying means is formed of quartz, glass, adhesive, polymer, metal thin film, or a complex material thereof, positioned across the optical waveguide.

12. The optical modulator according to claim 1, wherein the polarization plane selection means is a thin plate polarizer provided across the optical waveguide in a state where a plane of the thin plate polarizer is inclined from a face perpendicular to the propagating direction of the optical waves in the optical waveguide.

13. The optical modulator according to claim 1, wherein the polarization plane adjustment means is a wavelength plate provided across at least a first branch waveguide in a state where a plane of the wavelength plate is inclined from a face perpendicular to the propagating direction of the optical waves in the optical waveguide.

14. The optical modulator according to claim 1, wherein the polarization plane adjustment means rotates the polarization planes of the optical waves propagating on the optical waveguide by 45°, and the polarization plane adjustment means is provided on the branch waveguides such that the polarization plane of the first optical wave is rotated in a different direction than the polarization plane of the second optical wave.

* * * * *